United States Patent [19]

Klein et al.

[11] Patent Number: 4,565,212

[45] Date of Patent: Jan. 21, 1986

[54] DEVICE FOR THE STEP-WISE PRESSURE RELEASE ON THE EXPANSION OF, IN PARTICULAR HOT, GASES

[75] Inventors: Walter Klein, Brunn am Gebirge; Herbert Rhemann, Vienna, both of Austria

[73] Assignee: OMV Aktiengesellschaft, Austria

[21] Appl. No.: 542,337

[22] Filed: Oct. 17, 1983

[30] Foreign Application Priority Data

Nov. 15, 1982 [AT] Austria .................................. 4143/82

[51] Int. Cl.$^4$ ...................... F16K 31/12; F16K 31/36
[52] U.S. Cl. ................................. 137/486; 137/487.5; 137/613; 251/123; 251/127
[58] Field of Search ........................ 251/121, 123, 127; 137/613

[56] References Cited

U.S. PATENT DOCUMENTS

| | | | |
|---|---|---|---|
| 1,271,758 | 7/1918 | Petito | 251/127 |
| 1,896,833 | 2/1933 | Bromsen et al. | 251/127 |
| 2,187,662 | 1/1940 | Pigott | 251/127 |
| 2,596,817 | 5/1952 | McGovney | 251/123 |
| 3,229,709 | 1/1966 | Gerken | 251/127 |
| 4,275,763 | 6/1981 | Fahrig | 137/613 |

FOREIGN PATENT DOCUMENTS 2070197  9/1981  United Kingdom ................ 251/123

Primary Examiner—A. Michael Chambers
Attorney, Agent, or Firm—Seidel, Gonda, Goldhammer

[57] ABSTRACT

The invention relates to a device for the step-wise pressure release on the expansion of, in particular hot, gases with highly different volume streams. In a device of this type, reaching or even exceeding the speed of sound is to be safely prevented. This is achieved in that at least two adjustable plate valves are arranged in series one behind the other, that the orifice of each plate valve is arranged eccentrically in relation to its central longitudinal axis, with the orifices of successive plate valves each arranged on opposite sides in relation to the rectilinearly extending, continuous central longitudinal axis common to all the plate valves and that the adjustment of the plate valves is effected as a function of the accumulated volume stream.

6 Claims, 4 Drawing Figures

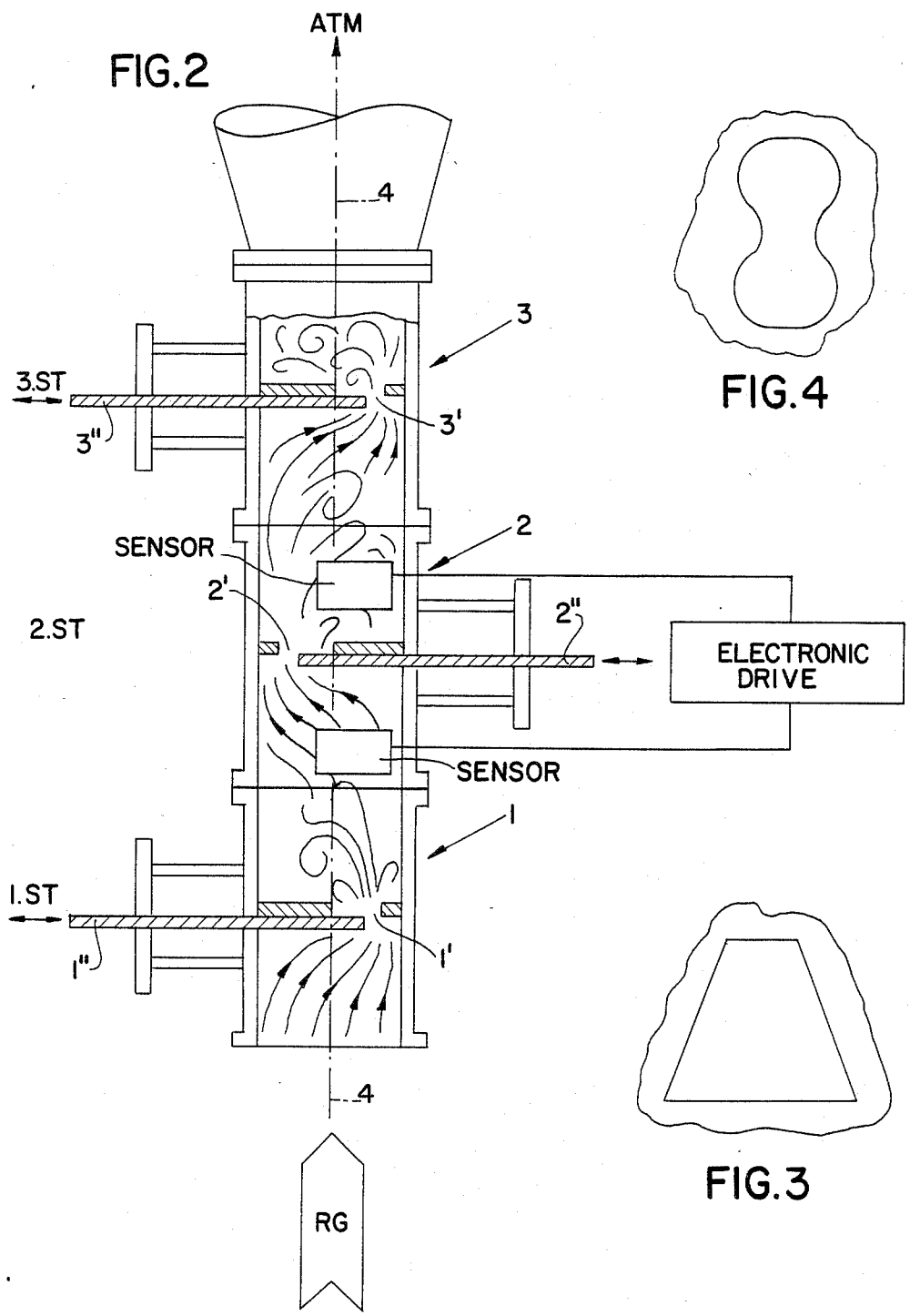

DEVICE FOR THE STEP-WISE PRESSURE RELEASE ON THE EXPANSION OF, IN PARTICULAR HOT, GASES

The invention relates to a device for the step-wise pressure release on the expansion of, in particular hot, gases with highly different volume streams.

In chemical and metallurgical plants, it is normal that hot gases with highly different volume streams accumulate and then either have to be transferred to another installation (such as a turbine) of lower pressure level or get discharged into the atmosphere. The known form of one-step pressure release or the multi-step pressure release by means of rigid throttle elements has many disadvantages.

A one-step pressure release involves the hazard of the creation of excessive gas flow rates which may even exceed the speed of sound and involve a high mechanical stress on the pipe system in addition to the generation of disturbing noises; moreover, the high gas flow rates cause increased damage by erosion and corrosion, particularly by the solids possibly contained in the hot gases.

The multiple-step pressure release by means of rigid throttle elements also entails the hazard of the occurrence of excessive and thus harmful gas flow rates when highly different volume streams are generated.

It is the object of the invention to eliminate these disadvantages and to provide a device for the pressure release of gases in which any reaching or even exceeding the speed of sound will be safely prevented even on the occurrence of highly different volume streams.

This is achieved according to the invention in a device as initially described by providing at least two adjustable plate valves which are arranged in series one behind the other so that the orifice of each plate valve is arranged eccentrically in relation to its central longitudinal axis, with the orifices of successive plate valves each arranged on opposite sides in relation to the recti-linearly extending, continuous central longitudinal axis common to all the plate valves, and by adjusting the plate valves as a function of the accumulated volume stream. It is practical to adjust each one of the plate valves as a function of the ratio of the pressure in front and behind this valve.

The device according to the invention brings about a reduction of the rate of flow of the gas in all stages of expansion and thus an essential reduction of the noise level and of the erosion and corrosion damages caused by the solid particles possibly entrained in the gas stream. The eccentrically arranged orifices of the plate valves and their alternating staggering in relation to the common central longitudinal axis of the plate valves create good possibilities of expansion of the gas stream after each individual pressure release step, namely, a high vorticity permitting an isothermic pressure release; the formation of vortices behind each plate valve also causes a reduction of the flow rate of the gas, which, among other things, permits a space-saving construction of the device according to the invention.

According to another embodiment of the invention, it is of advantage if the orifice of at least one of the plate valves viewed in flowing direction is at least partially trapezoid or hour-glass shaped.

A device particularly economic in respect of the ratio between expenditure and effect is achieved when three successive adjustable plate valves are so arranged in series that the adjustment of the middle plate valve is effected from one side and the adjustment of the first and last plate valve is effected from the side opposite in relation to the central longitudinal axis of the plate valves.

A further object of the invention is an adjustable plate valve for a device according to the invention which is characterized in that its orifice is arranged eccentrically in relation to its central longitudinal axis.

The invention is described in detail under reference to the accompanying drawings.

FIG. 1 shows a block diagram representing the basic problem solved by the invention and FIG. 2 an exemplary embodiment of the device according to the invention.

FIG. 3 is a plan view of a trapezoid shaped orifice.

FIG. 4 is a plan view of an hour-glass shaped orifice.

In FIG. 1, the flue gases coming from the chemical or metallurgical plant bear the reference symbol RG. In the instant application, the pressure release is carried out on the flue gases emitted by a catalytic cracking plant. These flue gases are normally pressure-released via two parallel paths shown as blocks W (exhaust heat recovery) and R (pressure maintenance by adjusting element) to atmospheric pressure (ATM). For a proper operation of the cracking plant, a predetermined operating pressure must be maintained in it; block R serves this purpose.

Caused by the operation of the plant, strongly differing amounts of flue gas must be released to atmospheric pressure in the pressure maintenance system of the plant (block R) as shown by the following exemplary operational cases:

Case 1: The thermal energy of the flue gas is for the major part recycled to the exhaust heat recovery (block W); oly a small portion is required for the maintenance of the operating pressure of the cracking plant; in this case, the volume of flue gas guided over the adjusting element (block R) is comparatively small, i.e. about 10 to 30 percent of the total volume.

Case 2: For service or in the event of failure of the exhaust heat recovery plant (block W), the entire flue gas stream of the cracking plant is guided over the adjusting element (block R); in this case, the volume of flue gas guided over the adjusting element is 100 percent of the total volume.

In order to cope with these strongly differing volume loads without reaching the speed of sound in the adjusting element, it is constructed according to the invention as represented in FIG. 2.

FIG. 2 shows three plate valves 1, 2, 3 arranged in series and forming a three-step pressure release means; the various steps from the higher to the lower pressure level are designated in FIG. 2 by 1.ST, 2.ST and 3.ST, RG is the entering flue gas and ATM the atmosphere. The orifices 1', 2' and 3' of the plate valves 1, 2, 3 are each arranged eccentrically in relation to the central longitudinal axis of each plate valve which in this case coincides with the common central longitudinal axis 4 of all the plate valves; moreover, the orifices 1', 2', 3' in successive plate valves, for instance 1 and 2 or 2 and 3, are each arranged on opposite sides of this common central longitudinal axis 4. This measure assures a good vorticity and pressure release of the flue gases in the device accoring to the invention.

FIG. 2 viewed in flowing direction shows the locking elements (valves) 1", 2", 3" cooperating with the orifices 1', 2', 3' in front of the shutters these latter are provided with; at appropriate construction of the guide means, they could of course also be arranged behind the shutters.

The adjustability of the locking elements 1", 2", 3" as a function of the accumulated flue gas stream or volume stream, shown in FIG. 2 by double arrows, can be effected automatically or manually by means of sensors or measuring instruments and aappropriate electronically controlled drives.

Of particular advantage is the control of the locking element of each step as a function of the ratio of the pressures in front of and behind this locking element.

It is practical to arrange the drives for control of the locking elements 1", 2", 3", as shown in FIG. 2, in successive plate valves 1 and 2 or 2 and 3, each from opposing sides in relation to the central longitudinal axis 4. But it would also be possible to provide each individual plate valve with locking elements and their drives acting on both sides.

The shape of the orifices 1", 2", 3" in plan view can be square, rectangular or polygonal, in particular trapezoid shaped as shown in FIG. 3. Further, the orifice may be circular, elliptical and in particular also hour-glass-like as shown in FIG. 4.

As it is known that counter pressure is a function of volume, and lowest at a small volume of the flue gas stream, this is the case of the greatest pressure difference to release; this is a critical case and the special shapes or partial special shapes of the orifices 1", 2", 3" are advantageously kept within the range of smaller passing volumes.

We claim:

1. A device for step-wise release of pressurized gases coprising means for controlling flow of gases at variable pressure and volume from a source to atmosphere as a function of accumulated volume and/or pressure of gases, said means including a flow conduit defined at least in part by a plurality of gate valves in series and terminating at a discharge port for discharge to atmosphere, each of said valves including a housing having a transversely movable valve member, said conduit including an expansion space for expansion of gases between successive valve members, successive valve members and their associated orifices being on diametrically opposite sides of said conduit so that successive orifices are eccentric with respect to the longitudinal axis of said conduit, and means for adjusting the gate valves as a function of the accumulated volume stream.

2. A device in accordance with claim 1 wherein said conduit is defined by the valve housings connected end to end.

3. Device for the step-wise pressure release on the expansion of, in particular hot gases with highly different volume streams, characterized in that at least two adjustable plate valves (1, 2, 3) are arranged in series one behind the other, that the orifice (1', 2', 3') of each plate valve (1, 2, 3) is arranged eccentrically in relation to its central longitudinal axis (4), with the orifices (1', 2', 3') of successive plate valves (1, 2, 3) each arranged on opposite sides in relation to the rectilinearly extending, continuous, central longitudinal axis (4), to all the plate valves (1, 2, 3), and means for adjusting the plate valves (1, 2, 3) as a function of the accumulated volume stream (RG).

4. Device for the step-wise pressure release on the expansion of, in particular hot, gases with highly different volume streams, characterized in that at least two adjustable plate valves (1, 2, 3) are arranged in series one behind the other, that the orifice (1', 2', 3') of each plate valve (1, 2, 3) is arranged eccentrically in relation to its central longitudinal axis (4), with the orifices (1', 2', 3') of successive plate valves (1, 2, 3) each arranged on opposite sides in relation to the rectilinearly extending, continuous central longitudinal axis (4) to all the plate valves (1, 2, 3), and means for adjusting each of the plate valves (1, 2, 3) as a function of the ratio of the pressures in front of and behind the plate valve (1, 2, 3).

5. Device according to claim 3 or 4, wherein the orifice (1', 2', 3') of at least one of the plate valves (1, 2, 3) viewed in flowing direction is at least partially trapezoid or hour-glass shaped.

6. Device according to any one of the claims 3 or 4, wherein three successive adjustable plate valves (1, 2, 3) are so arranged in series that the adjustment of the middle plate valve (2) is effected from one side and the adjustment of the first (1) and last (3) plate valve is effected from the side opposite in relation to the central longitudinal axis (4) of the plate valves (1, 2, 3) (FIG. 2).

* * * * *